(No Model.)
B. B. ALLEN.
REAMER.
No. 450,879.  Patented Apr. 21, 1891.
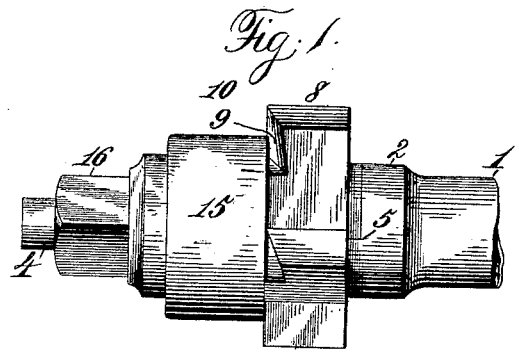
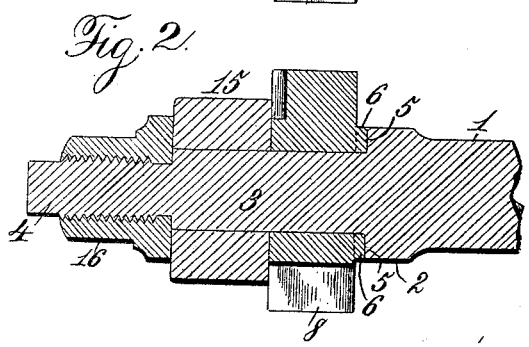
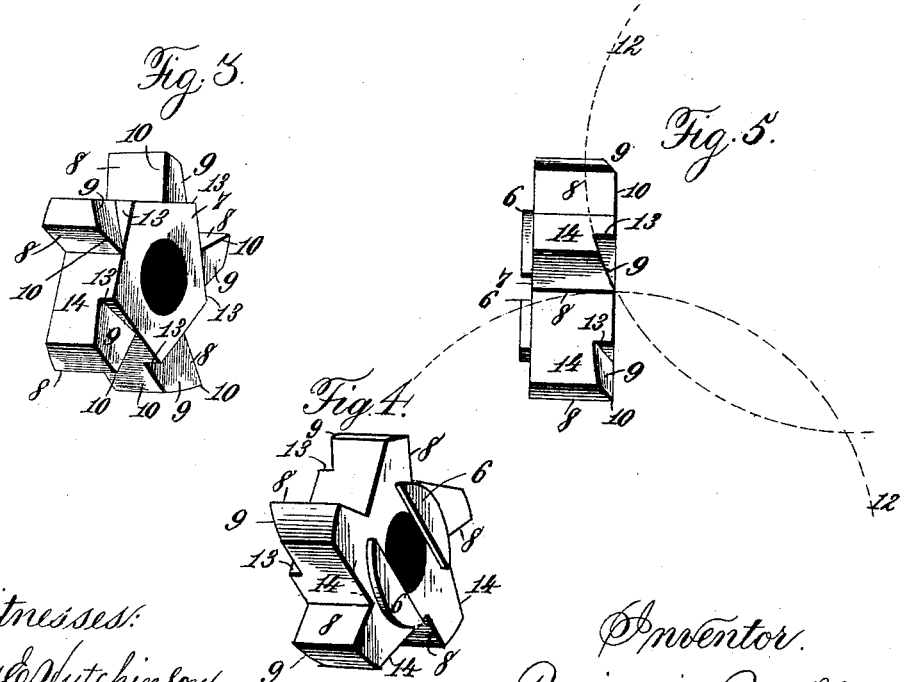
Witnesses:
Jas. E. Hutchinson.
Robert Everett.
Inventor.
Benjamin B. Allen,
By James L. Norris.
Attorney.

UNITED STATES PATENT OFFICE.

BENJAMIN B. ALLEN, OF NASHVILLE, TENNESSEE.

REAMER.

SPECIFICATION forming part of Letters Patent No. 450,879, dated April 21, 1891.

Application filed January 31, 1891. Serial No. 379,796. (No model.)

*To all whom it may concern:*

Be it known that I, BENJAMIN B. ALLEN, a citizen of the United States, residing at Nashville, in the county of Davidson and State of Tennessee, have invented new and useful Improvements in Reamers, of which the following is a specification.

This invention has for its object to provide a novel and efficient manifold toothed cutter for boring the boxes of shafting, whereby it is unnecessary to bolt the boxes to the face-plate of a lathe.

The invention also has for its object to provide a manifold toothed cutter which can be secured to and removed from the cylindrical shank of a mandrel and be locked to the latter when in operation in such manner as to relieve the weakest part from strain and make it substantially as though it were integral with the mandrel, while permitting it to be removed, as stated, for the purpose of substituting a similar cutter of different diameter.

The invention also has for its object to provide a manifold toothed cutter which can be secured to and removed from its supporting-mandrel, and wherein each tooth can be ground at its face and at one end by an ordinary circular grinding-stone to form a sharp cutting-edge, arranged approximately at right angles to the axis of the mandrel, without in any way reducing the diameter of the cutter.

The invention also has for its object to provide a novel and efficient reamer wherein a manifold cutter is so constructed as to be ground and sharpened by an ordinary circular grindstone without reducing its diameter, while permitting such cutter to be removed and a new cutter substituted therefor, as occasion may demand.

To accomplish all these objects my invention involves the features of construction, the combination or arrangement of devices, and the principles of operation, hereinafter described and claimed, reference being made to the accompanying drawings, in which—

Figure 1 is a side elevation of a reamer constructed in accordance with my invention. Fig. 2 is a longitudinal sectional view of the same. Fig. 3 is a detail perspective view looking at the front end of the cutter. Fig. 4 is a similar view looking at the rear end of the cutter, and Fig. 5 is a diagram illustrating the manner of grinding the front face and one end of a cutter-tooth for producing the rectilinear sharpened cutting-edge.

In order to enable those skilled in the art to make and use my invention, I will now describe the same in detail, referring to the drawings, wherein—

The numeral 1 indicates the mandrel of the reamer, having a collar 2 and a shank 3, which is truly cylindrical and terminates at its extremity in a screw-threaded stem 4. The front face of the collar is formed with cavities 5 to receive and interlock with the shoulders 6, formed with and projecting from the rear face of the manifold toothed cutter 7, whereby the cutter is not only compelled to rotate with the mandrel, but the weakest part of the cutter resulting from the bore therein to receive the cylindrical shank 3 is relieved of strain, and the cutter is made substantially as strong as though it were an integral part of the mandrel.

I have shown the cutter as formed integral with a series of five radial teeth; but more or less may be employed so long as a sufficient number is provided to cut a true circular bore when the cutter is revolved for enlarging the hole in a shaft-boxing after the sand has been removed from the latter. The teeth are each formed with a rectilinear face 8 and a beveled or oblique front end 9, which runs backward at an acute angle to the face 8 of the tooth, the construction being such that a rectilinear cutting-edge 10 is produced which is radial and extends at right angles to the longitudinal axis of the mandrel. The rectilinear faces 8 of the teeth are all coincident with the longitudinal axis or center of the cutter and of the mandrel, and since the front ends of the teeth are oblique or beveled and extend backward or rearward at acute angles to the faces of the teeth it is possible to conveniently, rapidly, and efficiently sharpen the cutter through the medium of an ordinary circular grindstone 12 in the manner indicated by the dotted lines, Fig. 5. The formation of the front ends of the teeth with backwardly-extending beveled portions 9 provide the hub or body portion of the cutter with offsets or shoulders 13, which constitutes guides or supports for the grindstone while grinding the beveled or oblique ends 9 of the teeth, while the rear sides 14 of the teeth serve as guides or bearings for the grindstone when grinding the front faces 8 to sharpen the rectilinear cutting-edges 10.

By the means described the cutting-edge of the tool can be readily sharpened by means of an ordinary circular grindstone without in the least reducing the diameter of the tool, and consequently, although the cutting-edge may become worn away from constant use, the diameter of the cutter as a whole remains unchanged. This is an important feature of my improved construction and entirely overcomes an objection existing in ordinary removable and replaceable manifold toothed cutters formed with longitudinal parallel teeth rounded off at their ends, for in the latter construction the cutting is effected by the longitudinal edges of the teeth, which are coincident with the axis of the cutter itself, and consequently to sharpen such teeth by grinding the diameter of the cutter is in a measure reduced each time it is ground.

The cylindrical shank 3 of the mandrel is of such length as to support the cutter and also receive and sustain a guide 15, which is adapted to enter the hole to be enlarged and maintain the cutter in a central position. This guide is formed as the section of a true cylinder, and with the cutter can be removed and replaced at will. The screw-stem of the shank is provided with a screw-nut 16 by which to clamp the guide against the cutter and hold the latter in interlocking engagement with the collar 2 of the mandrel. This construction provides a strong, substantial, and durable reamer, which is particularly designed for finishing the brass boxes for shafting after the sand has been removed from the castings, the holes or orifices in the castings being made to fit the guide 15, which is immediately in front of the manifold toothed cutter. The improved cutter will enlarge many holes or orifices of exactly the same diameter without corrugating the surfaces of the bores, as is done by the present reamer and lathe-tool ordinarily employed in finishing brass boxes for shafting.

The construction of the cutter is such that by giving the teeth the requisite rake it can be used for cutting any material, including wood.

The cutter is made removable and replaceable for the purpose of enabling any one of its series of cutters to be used on the mandrel for the purpose of cutting holes of different diameters, while permitting a cutter, if broken, to be promptly replaced at a small expense.

Having thus described my invention, what I claim is—

1. A reamer comprising a manifold toothed cutter having each tooth formed with a rectilinear face 8, coincident with the axis of the reamer, and a beveled front end 9, running backward at an acute angle to the face to form a rectilinear cutting-edge 10, arranged at right angles to the longitudinal axis of the reamer for the purpose of enabling the teeth to be ground by an ordinary grindstone without in any way reducing the diameter of the cutter, substantially as described.

2. A reamer consisting of a mandrel 1, having a collar 2, provided with cavities 5, and a truly cylindrical shank 3, integral with a screw-stem 4, a manifold toothed cutter provided with shoulders 6 to engage the cavities, and having each tooth formed with a rectilinear face 8, coincident with the axis of the mandrel, and a beveled front end 9, running backward at an acute angle to the face to form a rectilinear cutting-edge 10, which is at right angles to the longitudinal axis of the mandrel, a cylindrical guide 15, fitting the shank and resting against the front end of the cutter, and a screw-nut which clamps the guide against the cutter and holds the latter in interlocking engagement with the collar of the mandrel, substantially as described.

3. A reamer comprising a removable and replaceable manifold toothed cutter having each tooth formed with a rectilinear face 8, coincident with the axis of the reamer, and a beveled front end 9, running backward or rearward at an acute angle to the face to form a rectilinear cutting-edge 10 approximately at right angles to the axis of the reamer, and provided with offsets or shoulders 13, which constitute guides or rests for a grindstone in grinding the beveled front ends of the teeth to sharpen the rectilinear cutting-edges, substantially as described.

In testimony whereof I have hereunto set my hand and affixed my seal in presence of two subscribing witnesses.

BENJAMIN B. ALLEN. [L. S.]

Witnesses:
PERCY D. MADDEN,
NATHAN COHN.